US011472703B2

(12) United States Patent
Küke

(10) Patent No.: US 11,472,703 B2
(45) Date of Patent: Oct. 18, 2022

(54) PROCESS AND APPARATUS FOR PRODUCING AN AQUEOUS SOLUTION CONTAINING CHLORINE DIOXIDE

(71) Applicant: Fritz Küke, Isernhagen (DE)

(72) Inventor: Fritz Küke, Isernhagen (DE)

( * ) Notice: Subject to any disclaimer, the term of this patent is extended or adjusted under 35 U.S.C. 154(b) by 105 days.

(21) Appl. No.: 17/040,772

(22) PCT Filed: Mar. 19, 2019

(86) PCT No.: PCT/EP2019/056892
§ 371 (c)(1),
(2) Date: Sep. 23, 2020

(87) PCT Pub. No.: WO2019/180049
PCT Pub. Date: Sep. 26, 2019

(65) Prior Publication Data
US 2021/0002135 A1    Jan. 7, 2021

(30) Foreign Application Priority Data

Mar. 23, 2018   (DE) ..................... 10 2018 107 018.7

(51) Int. Cl.
*B01D 53/14*     (2006.01)
*B01J 19/24*     (2006.01)
*C01B 11/02*     (2006.01)

(52) U.S. Cl.
CPC ........ *C01B 11/028* (2013.01); *B01D 53/1406* (2013.01); *B01D 53/1456* (2013.01);
(Continued)

(58) Field of Classification Search
CPC .......... B01D 2252/202; B01D 2257/20; B01D 53/1406; B01D 53/1456; B01D 2252/103;
(Continued)

(56) References Cited

U.S. PATENT DOCUMENTS 3,854,900 A    12/1974   Upatnieks
3,854,901 A    12/1974   Cowley
(Continued)

FOREIGN PATENT DOCUMENTS

| CN | 106553997 | 4/2017 |
|----|-----------|--------|
| EP | 2662328   | 11/2013 |
| GB | 760303    | 10/1956 |

OTHER PUBLICATIONS

Wikipedia, Stichwort: Chlordioxid, URL: https://de.wikipedia.org/ [recherchiert am Nov. 14, 2018] (Wikipedia, Keyword chlorine dioxide, URL: https://de.wikipedia.org/ [researched Nov. 14, 2018]).

*Primary Examiner* — Timothy C Vanoy
(74) *Attorney, Agent, or Firm* — Duane Morris LLP; Gregory M. Lefkowitz; Brandon A. Chan

(57) ABSTRACT

The present invention relates to a process for producing an aqueous solution containing chlorine dioxide from gaseous chlorine dioxide and from an aqueous phase. The invention additionally relates to an apparatus for producing an aqueous solution containing chlorine dioxide and/or for carrying out the process of the invention. Finally, the invention also relates to the use of an apparatus according to the invention for carrying out a process according to the invention. In the following, all statements made in respect of the process of the invention also apply correspondingly to the apparatus of the invention and the use according to the invention, and vice versa, unless indicated otherwise in the individual case.

24 Claims, 3 Drawing Sheets

Figure 1:
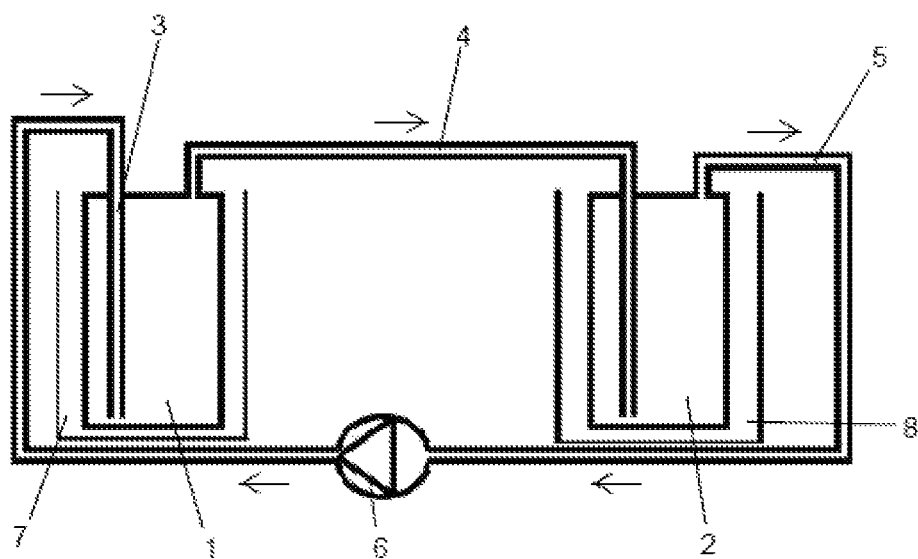

(52) U.S. Cl.
CPC ......... *B01J 19/245* (2013.01); *B01J 19/2465* (2013.01); *B01D 2252/103* (2013.01); *B01D 2252/202* (2013.01); *B01D 2257/2025* (2013.01); *B01J 2219/00051* (2013.01)

(58) Field of Classification Search
CPC .......... B01D 2257/2025; B01J 19/2465; B01J 19/245; B01J 2219/00051; C01B 11/028
See application file for complete search history.

(56) References Cited

U.S. PATENT DOCUMENTS

| | | |
|---|---|---|
| 5,154,910 A | 10/1992 | Engstrom |
| 2006/0022360 A1 | 2/2006 | Nanjundiah |

PROCESS AND APPARATUS FOR PRODUCING AN AQUEOUS SOLUTION CONTAINING CHLORINE DIOXIDE

CROSS-REFERENCE TO RELATED APPLICATIONS

This application is a § 371 national stage entry of International Application No. PCT/EP2019/056892, filed on Mar. 19, 2019, which claims priority to German Patent Application No. 10 2018 107 018.7, filed on Mar. 23, 2018, the entire contents of which are incorporated herein by reference.

The present invention relates to a process for producing an aqueous solution containing chlorine dioxide from gaseous chlorine dioxide and from an aqueous phase. The invention additionally relates to an apparatus for producing an aqueous solution containing chlorine dioxide and/or for carrying out the process of the invention. Finally, the invention also relates to the use of an apparatus according to the invention for carrying out a process according to the invention. In the following, all statements made in respect of the process of the invention also apply correspondingly to the apparatus of the invention and the use according to the invention, and vice versa, unless indicated otherwise in the individual case.

The invention relates to the technical field of production of aqueous solutions containing chlorine dioxide and the purification of such aqueous chlorine dioxide solutions.

Chlorine dioxide is a gas which can readily be separated off, for example stripped, from aqueous solutions, for example from those aqueous solutions in which it has been produced by one of the various synthetic methods which a person skilled in the present technical field will customarily employ.

The transfer of chlorine dioxide gas from, for example, an aqueous (starting) solution and the collection of the transferred chlorine dioxide gas in a liquid medium (for example an aqueous phase) which does not react, or does not react to any significant extent, with chlorine dioxide appears to be advantageous for separating chlorine dioxide from accompanying materials which are not volatile and therefore remain in the aqueous (starting) solution, e.g. a reaction solution. In this way, the chlorine dioxide can be freed of these accompanying materials and thus be purified.

In W. J. MASSCHELEIN, RIP G. RICE: "Chlorine Dioxide, Chemistry and environmental impact of 4. oxychlorine compounds", 1979, ANN ARBORSCIENCE, page 10-11; pp. 125-126, it is described that chlorine dioxide is purified in laboratories by outgassing of the chlorine dioxide from aqueous solutions by passing a gas through these solutions or removing the chlorine dioxide gas from the solution by application of a vacuum. The chlorine dioxide gas, which can, for example, by accompanied by chlorine, is subsequently conveyed through an absorber tower which can be filled with arsenite or with solid or concentrated sodium chlorite.

On page 126, an example of a production plant utilizing the removal of gaseous chlorine dioxide is described. Here, sodium chlorite solution is reacted with hydrochloric acid in a reaction zone over a period of 1-2 minutes to give chlorine dioxide. A water jet pump (ejector) transfers chlorine dioxide gas into a fresh feed water which can subsequently be used for the respective application.

DE 10 2010 011 699 A1 discloses a process and an apparatus for producing a chlorine dioxide solution. Chlorine dioxide is produced by reaction of chlorite with acid in a reaction zone and transferred as gaseous chlorine dioxide into a separate vessel. The use of water jet pumps is disclosed, and a gas stream which is passed through the reaction solution and in the process entrains the chloride dioxide is disclosed as further means for transferring the chlorine dioxide from the reaction solution. The gas can be ambient air but can also be another gas such as carbon dioxide, nitrogen or other gases which are stable to chlorine dioxide.

EP 2 662 328 A1 discloses a process and an apparatus for producing chlorine dioxide. It is disclosed that chlorite is reacted with acid in aqueous solution in a reactor and the gaseous chlorine dioxide formed is transferred into a separate vessel. The reactor is divided by at least one dividing wall made of a porous material into at least two reactor chambers for the reaction of chlorite with acid. In a last reactor chamber, gas is introduced and in the first reactor chamber the gaseous chlorine dioxide formed is taken off in admixture with the introduced gas and transferred into fresh water. In the process disclosed, a water jet pump can be used as vacuum pump. The gaseous chlorine dioxide formed can be dissolved in the driving water of the water jet pump. Example 1 of the document EP 2 662 328 A1 discloses the concentrations in which chlorine dioxide is obtained in specific process variants.

DE 843 999 of Jul. 14, 1952 discloses a process for producing chlorine dioxide. Alkali metal chlorite or alkaline earth metal chlorite is reacted in the presence of water with alkali metal persulfate or alkaline earth metal persulfate while passing an inert gas through the mixture at pH values of from about 3 to 11 and at temperatures of preferably from 20° C. to 65° C. and the gas mixture is passed through an absorption tower.

The document "Herstellung von reinem Chlordioxid im Laboratorium", UMWELT UND DEGUSSA, DEUTSCHLAND, Produkte, Verfahren und Methoden—1991, pages 1-4, discloses the production of chlorine dioxide by reaction of sodium chlorite ($NaClO_2$) with sodium peroxodisulfate ($Na_2S_2O_8$). At a 25% excess based on sodium peroxodisulfate and based on the stoichiometrically required amount, a chlorine dioxide stock solution containing about 3 g of $ClO_2$/l is produced "overnight". According to Table 1, the chlorine dioxide stock solution has a pH of from 3.40 to 3.10 after standing for from 0 to 77 days. The document discloses that, after production of the chlorine dioxide, the chlorine dioxide can be driven off from a wash bottle by means of a stream of nitrogen and can be absorbed in a cooled reservoir of water which is present in a wash bottle connected in series to the wash bottle containing the chlorine dioxide solution. This wash bottle provided for absorption is cooled. Here, concentrations up to 7 g of $ClO_2$/l can be produced. The stream of nitrogen, which still contains proportions of chlorine dioxide, is released into the open "above the roof" or the chlorine dioxide gas is completely absorbed by passage through a 10-20% strength sodium hydroxide solution, so that no chloride dioxide gets outdoors.

The document White, G. C.; "Handbook of chlorination and alternative Disinfectants"; 4th Edition, John Wiley & Sons, Inc., (1999), pages 1171 and 1172 discloses systems for producing chlorine dioxide solutions. Chlorine dioxide produced is stripped from a reaction solution by means of a stream of nitrogen and introduced into a reservoir of water which, according to FIG. 12-9, is cooled. It should be noted that chlorine dioxide is not stripped from the collection reservoir.

GB 760 303 A discloses an apparatus for absorbing a desired component from a "rich" gas in an absorption step, separation of a gas which is "lean" in respect of the desired component from the absorption step, enrichment of the "lean" gas and recirculation of the latter to the absorption step. GB 760 303 A additionally discloses a process for producing chlorine dioxide hydrate, comprising, inter alia, production of chlorine dioxide gas in a production zone, mixing of this chlorine dioxide gas with a gas having a low chlorine dioxide content and introduction of the resulting gas mixture into a volume of water which is maintained in an absorption zone under such conditions that part of the chlorine dioxide is absorbed and forms chlorine dioxide hydrate.

US 2006/0022360 A1 discloses a chlorine dioxide solution generator comprising (a) a chlorine dioxide gas source; (b) an absorption circuit for dissolving chlorine dioxide in a stream of liquid; and (c) a gas transfer arrangement which is arranged between the chlorine dioxide gas source and the absorption circuit. US 2006/0022360 A1 additionally discloses a process for producing a chlorine dioxide solution, comprising the steps (a) provision of a source of chlorine dioxide gas; (b) dissolution of chlorine dioxide in a stream of liquid by means of an absorption circuit; (c) intermediate installation of a gas circulation pump between the chlorine dioxide gas source and the absorption circuit; (d) intermediate installation of an outlet distributor arrangement between the gas circulation pump outlet opening and the absorption circuit; and (e) inhibition of the decomposition of chlorine dioxide in the pressurized chlorine dioxide gas stream.

CN106553997A discloses (according to the WPI abstract thereof) a chlorine dioxide production plant for use in oil and gas recovery, comprising, inter alia, a sensor for chlorine. CN106553997A additionally discloses that the concentration of chlorine dioxide is controlled.

The Wikipedia article "Chlorine dioxide" of Nov. 14, 2018 discloses various processes for producing chlorine dioxide, for example the peroxodisulfate-chlorite process, the hydrochloric acid-chlorite process and the chlorine-chlorite process.

Although the documents discussed above disclose thoroughly practical processes and apparatuses for producing an aqueous solution containing chlorine dioxide and in particular some of these documents also disclose processes and apparatuses in which gaseous chlorine dioxide is introduced into an aqueous phase and is partially absorbed there, so as to result in an aqueous solution containing chlorine dioxide, the technical teachings disclosed are still not completely satisfactory. Thus, it is considered to be disadvantageous that the carrier gases used in each case (e.g. air, carbon dioxide or nitrogen, which are soluble to only a small extent in water) have to be removed again from the respective system together with the chlorine dioxide which has not been absorbed in water. According to the prior art, this occurs either into the environment ("above the roof") or by subjecting the carrier stream with the residual chlorine dioxide gas present therein to a chemical after-treatment in which the carrier stream is introduced, for example, into a strongly alkaline solution where chlorine dioxide disproportionates into chlorite and chlorate. The abovementioned measures appear to be ecologically problematical and also technically inefficient. In the case of the absorption of chlorine dioxide into an absorption tower or condensation into the water of a water jet pump, the resulting chlorine dioxide content in the aqueous solution is also dependent on the volume flow and the temperature of the absorbing medium. Saturation of an absorbing aqueous phase with chlorine dioxide is not possible at the short contact times associated with the above-described industrial processes. Thus, solutions of chlorine dioxide having only a comparatively low concentration relative to the reaction solution are produced, so that appropriately large transfer pumps, etc., have to be used in practice to achieve a predetermined final chlorine dioxide concentration in a system volume to be treated (in particular to be disinfected).

Relatively highly concentrated chlorine dioxide solutions, for which there is a great demand in practice, cannot be produced, or cannot be produced without additional steps, using the processes and apparatuses disclosed in the documents referred to above. This is considered to be disadvantageous.

It was therefore a primary object of the present invention to provide a process and a corresponding apparatus by means of which it is possible to produce an aqueous solution containing chlorine dioxide which is comparatively highly concentrated from gaseous chlorine dioxide and an aqueous phase.

The process to be indicated and the apparatus to be indicated should preferably contribute to chlorine dioxide not being released into the environment. Further preferably, the process to be indicated and the apparatus to be indicated should contribute to partial amounts of the chlorine dioxide produced not having to be destroyed again in order to avoid ecologically disadvantageous effects. Further objects can be derived from the following text.

In a first aspect of the present invention, individual objects or all objects mentioned above are achieved by a process as defined in the accompanying claims.

In a further aspect, individual objects or all of the objects mentioned are achieved by an apparatus as defined in the accompanying claims.

In addition, the present invention also provides for a corresponding use of an apparatus according to the invention for carrying out a process according to the invention.

The invention firstly provides a process for producing an aqueous solution containing chlorine dioxide from gaseous chlorine dioxide and from an aqueous phase, e.g. by transfer (e.g. introduction) of gaseous chlorine dioxide into an aqueous phase, comprising the following steps:

(a) production of a first aqueous solution comprising dissolved chlorine dioxide and further dissolved constituents, (b) transfer of dissolved chlorine dioxide from the first aqueous solution produced into a first gas stream comprising a carrier gas, resulting in a second gas stream which comprises carrier gas and is enriched in gaseous chlorine dioxide, (c) transfer of gaseous chlorine dioxide from the second gas stream into an aqueous phase, with chlorine dioxide being dissolved in the aqueous phase to form the aqueous solution containing chlorine dioxide and a third gas stream which is depleted in chlorine dioxide being formed, (d) production of further amounts of the first gas stream
    from the third gas stream
    or
    from a chlorine dioxide-containing fraction of the third gas stream and further added gaseous compounds and repetition or continuation of the above process steps (b) and (c) so that further amounts of chloride dioxide are dissolved in the aqueous phase, where the production of a first aqueous solution comprising dissolved chlorine dioxide and further dissolved constituents in step (a) is preferably carried out by a process selected from the group consisting of:
  acid-chlorite process,
  hydrochloric acid-chlorite process,
  acid-hypochlorite-chlorite process,
  peroxodisulfate-chlorite process,
  peroxodisulfate-peroxomonosulfate-chlorite process,
  chloride electrolysis process,
  chlorite electrolysis process
and where
the first aqueous solution in step (b) preferably has a temperature $T_1$ and the aqueous phase in step (c) preferably has a temperature $T_2$, where $T_2$ is less than $T_1$.

Further preferred embodiments are defined in the claims.

It is particularly relevant for the process of the invention that in step (d) further amounts of the first gas stream (i.e. the gas stream into which dissolved chlorine dioxide is transferred from the first aqueous solution in step (b)) are produced either from the third gas stream (i.e. the gas stream which is formed in step (c) and is depleted in chlorine dioxide) or from a chlorine dioxide-containing fraction of this third gas stream and further added gaseous compounds. The third gas stream is thus not released, or at least not entirely released, into the environment but is instead advantageously used as stream of value in the process of the invention. Accordingly, the process steps (b) and (c) are repeated or continued after carrying out step (d), i.e. after the production of further amounts of the first gas stream, so that further amounts of chlorine dioxide are dissolved in the aqueous phase (cf. the definition for step (c)). In particular, chlorine dioxide from the third gas stream (i.e. chlorine dioxide which has not been absorbed in the aqueous phase in step (c) of the process of the invention and thus has not directly become a constituent of the aqueous solution containing chlorine dioxide) is not discarded but instead is advantageously utilized by being integrated into the further amounts of the first gas stream and thus contributing, by repetition or continuation of the steps (b) and (c), to further amounts of chlorine dioxide being dissolved in the aqueous phase as per step (c).

Compared to the prior art, it is thus possible according to the invention to obtain a more concentrated aqueous solution (in step (c) of the process of the invention) using an equal amount of chlorine dioxide or to obtain an equally high concentration of chloride dioxide in aqueous solution using a smaller amount of chlorine dioxide produced. The process of the invention is thus advantageous both from ecological and economic points of view.

The production of a first aqueous solution comprising dissolved chlorine dioxide and further dissolved constituents in step (a) of a process of the invention is preferably carried out by a process selected from the group consisting of
  acid-chlorite process,
  hydrochloric acid-chlorite process (cf., for example, DIN EN 12671),
  acid-hypochlorite-chlorite process (cf., for example, DIN EN 12671),
  peroxodisulfate-chlorite process (cf., for example, DIN EN 12671),
  peroxodisulfate-peroxomonosulfate-chlorite process,
  chloride electrolysis process (cf., for example, WO 2015/131874 A2),
  chlorite electrolysis process (cf., for example, DE 10 2013 010 950 A1).

As regards the designations used above for the production processes, cf., inter alia, DIN EN 12671:2016-09.

Although all of the abovementioned processes are suitable for producing a first aqueous solution comprising dissolved chlorine dioxide and further dissolved constituents, the acid-chlorite process, hydrochloric acid-chlorite process, acid-hypochlorite-chlorite process, peroxodisulfate-chlorite process and peroxodisulfate-peroxomonosulfate-chlorite process are preferred over the electrolysis processes (chloride electrolysis process and chlorite electrolysis process). The reason for this is that one or more of the following disadvantages are in some cases associated with carrying out the electrolysis processes:
  carrying out the electrolysis processes requires a (comparatively) high outlay in terms of apparatus.
  The hydrogen formed on the cathode side in the electrolysis processes has to be disposed of safely in order to prevent formation of an $H_2O_2$ gas mixture (risk of explosion).
  In order for the electrolysis (and thus the production of chlorine dioxide) not to cease, the electrolysis processes have to be (i) operated using softened water or (ii) the cathodes regularly have to be freed of lime ($CaCO_3$) and similar deposits (attributable to hardness formers).

In the process of the invention, the aqueous solution as per step (a) contains further dissolved constituents in addition to the dissolved chlorine dioxide. One, two or more of the further dissolved constituents of the first aqueous solution produced in step (a) are preferably selected from the group consisting of acids and acid anhydrides, compounds containing peroxo groups and chlorine-containing compounds, where the compounds containing peroxo groups are preferably selected from the group consisting of
  peroxodisulfate, preferably sodium peroxodisulfate, and peroxomonosulfate, preferably potassium peroxomonosulfate,
and/or
where the chlorine-containing compounds are preferably selected from the group consisting of
  molecular chlorine, chloride, hypochlorite, chlorite and chlorate
and/or
where the acids and acid anhydrides are preferably selected from the group consisting of
  mineral acids, preferably selected from the group consisting of sulfuric acid, hydrochloric acid, phosphoric acid and nitric acid,
  and
  organic acids and organic anhydrides, preferably selected from the group consisting of acetic acid, acetic anhydride and propionic acid.

It goes without saying that said further dissolved constituents are dependent on the processes used for producing the first aqueous solution comprising dissolved chlorine dioxide and further dissolved constituents. However, the advantages of the process of the invention are largely independent of the choice of this production process for the first aqueous solution and thus of the presence of particular dissolved constituents; reference may in this respect be made to what has been said above.

In one process according to the invention, the carrier gas used in step (b) is preferably inert toward chlorine dioxide. The carrier gas is preferably selected from the group consisting of air, nitrogen, carbon dioxide, oxygen, noble gases and mixtures thereof. Of course, a person skilled in the art can also use carrier gases other than the preferred carrier gases mentioned here, depending on the requirements of the individual case. It goes without saying that in the process of the invention the carrier gas is preferably selected so that it is less readily soluble than chlorine dioxide in water, preferably both at the temperature of the first aqueous solution and also at the temperature of the aqueous phase as per step (c).

It has been mentioned above that, owing to the inventive measure according to step (d) of the process of the invention, chlorine dioxide from the third gas stream is used for producing further amounts of the first gas stream. Preference is accordingly given to the first gas stream used in step (b) of the process of the invention containing a proportion of chlorine dioxide for at least some of the time, preferably at least after step (d). Of course, the first gas stream used in step (b) can also contain a proportion of chlorine dioxide from the beginning, i.e. before any further amounts of the first gas stream are produced according to step (d). However, use is usually made initially of a first gas stream which is free of chlorine dioxide; a first gas stream containing a proportion of chlorine dioxide is then used after carrying out step (d) and in the repetition or continuation of the process steps (b) and (c).

The composition of the first gas stream thus changes during this usual procedure; the proportion of chlorine dioxide in the first gas stream is very small (or no chlorine dioxide at all is present) at the beginning, and later, after the third gas stream has been formed and the third gas stream or chlorine dioxide-containing fractions of the third gas stream are utilized in order to produce further amounts of the first gas stream (cf. step (d)), the concentration of chlorine dioxide in the first gas stream is higher.

According to the invention, it is advantageous for the first gas stream to be introduced into the first aqueous solution produced in step (a), preferably introduced finely divided (i.e. in finely divided form), in order to carry out step (b), with the first aqueous solution preferably being produced in a first vessel in step (a) and the first gas stream being introduced into the first aqueous solution produced as per step (a) in the first vessel in order to carry out step (b). Thus, the first aqueous solution is preferably treated with the first gas stream in the (first) vessel in which it is produced so that dissolved chlorine dioxide is transferred into the first gas stream, resulting in the second gas stream.

The introduction or introduction in finely divided form is preferably carried out in a way known to a person skilled in the art, for example using an immersed tube, a gas lance, a frit or the like. The items of apparatus mentioned are also preferred constituents of an apparatus according to the invention, as is described in detail below.

The introduction of the first gas stream in finely divided form into the first aqueous solution produced in step (a) is advantageous for the absorption of chlorine dioxide in the first gas stream. To promote the absorption, the presence of internals or the like in the apparatuses and devices to be used is also advantageous. In this respect, a comparison may again be made with what is said further below with regard to the apparatus of the invention.

If the production of a first aqueous solution comprising dissolved chlorine dioxide and further dissolved constituents in step (a) is carried out by an electrolysis process (chloride electrolysis process or chlorite electrolysis process), it is advantageous for the first gas stream preferably to be introduced into the first aqueous solution produced according to step (a) for carrying out step (b) in such a way that the electrode(s) (preferably the anode) does not come into contact with the introduced gas. In other words: the (reactive) surface of the anode being decreased by contact with the first gas stream for carrying out step (b) is preferably avoided; otherwise, the space-time yield (or the area-time yield) of chlorine dioxide would namely decrease during the electrolysis.

In a process according to the invention, the second gas stream resulting from step (b) is preferably introduced, preferably introduced finely divided, i.e. preferably introduced in finely divided form, into the aqueous phase for carrying out step (c). This preferred measure is preferably combined with the measure discussed above, according to which the first gas stream is introduced, preferably introduced finely divided, into the first aqueous solution produced in step (a) for carrying out step (b). As regards the introduction or finely divided introduction of the second gas stream resulting from step (b) into the aqueous phase for carrying out step (c), the above remarks in respect of introduction of the first gas stream into the first aqueous solution produced according to step (a) apply analogously, mutatis mutandis.

A person skilled in the art will preferably configure step (c) of the process of the invention in such a way that gaseous chlorine dioxide is transferred from the second gas stream into the aqueous phase very efficiently, so that chlorine dioxide is dissolved in the very high concentration in the aqueous phase to form the aqueous solution containing chlorine dioxide and a third gas stream which is very largely depleted in chlorine dioxide is formed. For this purpose, a person skilled in the art will undertake the measures which are possible and acceptable in practice for promoting the absorption of chlorine dioxide in the aqueous phase. Introduction of the second gas stream in finely divided form into the aqueous phase is here a preferred measure in the context of step (c).

It goes without saying that (i) the solubility of chlorine dioxide in aqueous solutions and likewise (ii) the rate of absorption of gaseous chlorine dioxide in an aqueous phase and (iii) the rate of desorption of chlorine dioxide from an aqueous phase is dependent on the temperature set in each case. The invention accordingly provides, in particular, a process in which the first aqueous solution in step (b) has a temperature $T_1$ and the aqueous phase in step (c) has a temperature $T_2$, where $T_2$ is less than $T_1$. The fact that, in this preferred embodiment, $T_2$ is less than $T_1$ creates conditions under which, at least in equilibrium, the chlorine dioxide concentration in the aqueous phase having the temperature $T_2$, i.e. in the aqueous solution containing chlorine dioxide formed in step (c), is higher than in the first aqueous solution having the temperature $T_1$, which still comprises further dissolved constituents. As a result, the separation of the chlorine dioxide from the first aqueous solution (cf. step (b)) and the absorption of the chlorine dioxide in the aqueous phase (to form the aqueous solution containing chlorine dioxide as per step (c)) proceed particularly completely.

$T_2$ (i.e. the temperature of the aqueous phase in step (c)) is preferably in the range from 0° C. to 15° C. In this temperature range, a particularly large amount of chlorine dioxide can dissolve in the aqueous phase.

The temperature $T_1$ (namely the temperature of the first aqueous solution in step (b)) is preferably in the range from 20 to 40° C., at this temperature, the solubility of chlorine dioxide in the aqueous solution is comparatively low, so that chlorine dioxide can be stripped particularly easily from the aqueous solution. The difference between $T_1$ and $T_2$ is preferably greater than 10 K; it is preferably in the range from 10 K to 40 K. Such temperature differences enable highly concentrated aqueous solutions containing chlorine dioxide to be produced particularly effectively. At least at equilibrium, the concentration of the chlorine dioxide in the aqueous phase formed by means of step (c) is also determined by the temperature of this aqueous phase and the temperature difference compared to the first aqueous solution.

In a process according to the invention, the concentration of chlorine dioxide to be set in the aqueous solution containing chlorine dioxide to be produced is preferably determined beforehand, and the temperature $T_2$ is then selected so that the chlorine dioxide concentration to be achieved in the aqueous solution to be produced is in equilibrium at said temperature $T_2$ or the concentration present at equilibrium is even higher than the concentration to be achieved; in the latter case, the process is then stopped as soon as the concentration to be achieved has been attained, i.e. before attainment of the equilibrium concentration.

In some cases, it is advantageous to dilute a chlorine dioxide-containing aqueous solution produced to a reduced chlorine dioxide concentration by addition of water; such diluted aqueous solutions containing chlorine dioxide are, in particular, stable in the long term at low temperatures.

Preference is given to a process according to the invention in which the aqueous phase is fixed in place in step (c), preferably arranged in a fixed position in a stationary vessel, or is moved, preferably moved as driving medium in a jet pump. Depending on the requirements of the individual case, it can be advantageous to introduce the second gas stream into a positionally fixed aqueous phase when carrying out step (c), for example by means of an immersed tube or the like, or to provide the aqueous phase in a moved state, for example as driving medium in a jet pump, so that the second gas stream is contacted by the moved aqueous phase (for example the driving medium of the jet pump) and absorbed by the moved medium. If the aqueous phase is used as driving medium in a jet pump when carrying out step (c), a double function is performed since the jet pump can at the same time be used as vacuum pump so that it brings about the transport of the second gas stream. In this respect, reference may be made to the explanations given in respect of the apparatus of the invention and to the examples.

In some cases, the aqueous solution which has been produced in step (a) and contains dissolved chlorine dioxide also contains dissolved chlorine. In these cases in particular, chlorine gas is also transferred from the first aqueous solution produced into the first gas stream in step (b) of a process according to the invention, so that the second gas stream is also enriched in chlorine gas. This is frequently unavoidable but also quite acceptable. However, the ratio of the amounts of chlorine gas to chlorine dioxide gas and/or the amount of chlorine gas in the second gas stream before step (c) is preferably reduced, preferably by selective chemical reaction of chlorine. A corresponding apparatus for carrying out the process of the invention advantageously contains a chlorine elimination unit, cf. what is set forth further below. Chlorine gas is preferably removed from the second gas stream by contacting the second gas stream with chlorite salt or an aqueous chlorite solution. Here, both chlorine dioxide and chloride are formed. However, chlorine can also be removed from the gas stream using other redox systems which react selectively with chlorine and (at least preferably) not with chlorine dioxide (e.g. using the arsenite mentioned in the documents of the prior art).

A corresponding measure for reducing the amount of chlorine gas in the second gas stream before step (c) is particularly preferred if the production of a first aqueous solution comprising dissolved chlorine dioxide and further dissolved constituents in step (a) is carried out by a process selected from the group consisting of
hydrochloric acid-chlorite process and
acid-hypochlorite-chlorite process.

In these processes in particular, chlorine gas is formed in a significant amount as by-product.

The process of the invention is preferably carried out in a closable apparatus (which is closed during operation according to the invention). Preference is here given to no gaseous chlorine dioxide escaping from the apparatus. This is in agreement with the objectives of the present invention. An apparatus according to the invention for carrying out the process of the invention is thus preferably closable; we refer to the corresponding information given further below.

A process according to the invention is preferably at least continued until
the ratio of chlorine dioxide concentration in the first aqueous solution to chlorine dioxide concentration in the aqueous solution formed in step (c) has reached a predetermined value
and/or
the chlorine dioxide concentration or the amount of chlorine dioxide in the aqueous solution formed in step (c) has reached a predetermined value.

In practice, a person skilled in the art will preferably predetermine the ratio of chlorine dioxide concentration in the first aqueous solution to chlorine dioxide concentration in the aqueous solution formed in step (c) to be achieved and/or the chlorine dioxide concentration or amount of chlorine dioxide in the aqueous solution formed in step (c) which is to be achieved before commencement of the process of the invention. Accordingly, the process of the invention is then continued at least until one of said predetermined values or until both predetermined values have been achieved. Only then will the further concentration of chlorine dioxide in the aqueous solution containing chlorine dioxide which has been or is to be produced be stopped in a preferred process according to the invention. As mentioned above, the temperature $T_1$ of the first aqueous solution in step (b) and the temperature $T_2$ of the aqueous phase in step (c) are particularly relevant parameters which a person skilled in the art can set in a suitable way in order to achieve the predetermined values.

In processes according to the invention, the disadvantages of the above-described processes of the prior art are, inter alia, eliminated particularly advantageously by dissolved chlorine dioxide produced (e.g. produced in a reactor) (cf. step (a)) being transferred (i.e., for example, stripped out) by means of a carrier gas, preferably by means of a carrier gas which is inert to chlorine dioxide (cf. step (b) and what has been said about preferred carrier gases), into a first gas stream and then transferred into an aqueous phase (cf. step (c)), with the aqueous phase preferably having a temperature which is lower than the temperature of the first aqueous solution (cf. the corresponding information given about the temperatures $T_1$ and $T_2$). The carrier gas transfers part of the chlorine dioxide gas to the water of this aqueous phase (cf. step (c)).

The chlorine dioxide-containing third gas stream or a chlorine dioxide-containing fraction of this third gas stream is preferably recirculated as part of the first gas stream back to the first aqueous solution in order to take up chlorine dioxide again; reference has already been made to the information given in respect of appropriately equipped apparatuses according to the invention.

As regards step (a) of the process of the invention, it is to be emphasized that the first aqueous solution with the chlorine dioxide dissolved therein can be present directly in the reactor in which the chlorine dioxide has been produced but can also be located, for example, in a separate storage tank into which a previously produced chlorine dioxide or reaction mixture containing chlorine dioxide has been transferred. The chlorine dioxide is then transferred in the manner described above from the first aqueous solution into a first gas stream, i.e., for example, stripped out (cf. step (a)).

As mentioned above, the process of the invention is preferably carried out in a closable apparatus in such a way that no gaseous chlorine dioxide escapes from the apparatus. The process is preferably carried out in a closable apparatus in such a way that neither gaseous chlorine dioxide nor carrier gas escapes from the apparatus. As regards the escape of gaseous chlorine dioxide and/or carrier gas, the process of the invention is thus preferably carried out in a closed system. In contrast to processes of the prior art, chlorine dioxide is thus not removed (or removed at most in small amounts) from the system in the preferred process according to the invention, but instead chlorine dioxide is preferably completely or at least essentially completely transferred into an aqueous phase by means of an (optionally multistage) absorption in a process according to the invention, so that a highly concentrated aqueous solution results.

It has surprisingly been found that, especially at low temperature $T_2$ in the aqueous phase in step (c) and large temperature differences between $T_2$ and $T_1$ (for preferred embodiments see above), it is possible to obtain a chlorine dioxide-containing aqueous solution having a high chlorine dioxide concentration which does not have a tendency to explode. Such aqueous solutions containing chlorine dioxide can then be used, employing comparatively small pumps or the like, in order to treat large volumes of aqueous mixtures to be treated (process water, mains water to be treated, swimming pool water or the like). Virtually complete depletion of the first aqueous solution (e.g. an appropriate reaction mixture) in chlorine dioxide can be achieved by means of a large temperature difference ($T_1$–$T_2$) between the aqueous solution in step (b) and the aqueous phase in step (c). For example, a chlorine dioxide reactor (a vessel in which the first aqueous solution is formed by reaction of appropriate reactants) is for this purpose heated to a particular temperature (to a temperature above ambient temperature) while at the same time the temperature in the aqueous phase in step (c) is brought to a low value by cooling. The solubility of the chlorine dioxide gas is in each case determined by the solubility coefficient at a particular temperature.

Preference is given to a process according to the invention in which the chlorine dioxide concentration in the aqueous solution containing chlorine dioxide which is formed in step (c)
  is in the range from 5 to 20 g/l, preferably in the range from 9 to 20 g/l, particularly preferably in the range from 12 to 20 g/l, very particularly preferably in the range from 15 to 20 g/l,
  and/or
  is set so that the corresponding concentration in the gas space at the prevailing temperature in accordance with DIN EN 12671:2016-09 is less than 300 g/m$^3$ and/or less than 10% by volume.

In preferred processes according to the invention, chloride dioxide-containing aqueous solutions formed in step (c) which have a high chlorine dioxide concentration and nevertheless do not tend to explode because of the low temperature ($T_2$) of the aqueous solution containing chlorine dioxide are thus sought. Since the magnitude of the still permissible chlorine dioxide concentration depends on the temperature of the aqueous solution containing chloride dioxide, setting of relatively low temperatures for the chlorine dioxide-containing aqueous solutions produced is preferred. Particular preference is given to a process according to the invention in which the chloride dioxide-containing aqueous solution formed in step (c) has a temperature in the range from 0 to 10° C. and a chlorine dioxide concentration in the range from 15 to 20 g/l.

To ensure that the chlorine dioxide-containing aqueous solution formed in step (c) does not have a tendency to explode, it is advantageous to set the chlorine dioxide concentration of the aqueous solution so that the corresponding concentration in the gas space at a given temperature is below the explosive limit for chlorine dioxide of 300 g/m$^3$ or 10% by volume (cf. DIN EN 12671:2016-09).

If very substantial depletion of chlorine dioxide from the first aqueous solution (e.g. a reaction mixture) is desired, a very substantial desorption of the chloride dioxide from the aqueous solution produced in step (a) can be achieved by, for example, multiple absorption in aqueous phases which each have a low concentration. Multiple absorption in aqueous phases each having a low concentration can be achieved using an appropriate number of absorption vessels (cf. what is said further below in connection with preferred apparatuses according to the invention) or gradually by respective replacement of an aqueous solution obtained in an earlier absorption step (step (c)) by a fresh aqueous phase having a high uptake capacity for chlorine dioxide.

A process according to the invention is preferably carried out so that the pH of the chlorine dioxide-containing aqueous solution produced according to the invention is identical to the pH of the aqueous phase which is used in step (c) (especially at the beginning of step (c)). The pH difference between the aqueous phase at the beginning of step (c) and the chlorine dioxide-containing aqueous solution produced therefrom at the point in time at which it is taken out or the point in time when step (c) is ended should preferably be not greater than 0.5, preferably not greater than 0.2.

A chlorine dioxide-containing aqueous solution produced using the process of the invention preferably has a ratio of the concentration of chlorine dioxide to the concentration of chlorate of greater than or equal to 2, particularly preferably greater than or equal to 5.71. An aqueous phase which is salt-free is preferably used initially in step (c). The chlorine dioxide-containing aqueous solution (formed in particular using this salt-free aqueous phase) is preferably likewise salt-free. The reason for the freedom from salts of the chlorine dioxide-containing aqueous solution formed is naturally the fact that the initially salt-free aqueous phase is contacted only with a gas stream in which no salts can be present. Salt-free aqueous solutions containing chlorine dioxide (as preferred product of a process according to the invention) are particularly suitable for residue-free atomization, for example for purposes of disinfection/sterilization of rooms. Furthermore, such salt-free aqueous solutions containing chlorine dioxide are particularly stable in the long term. Since salt-free aqueous solutions containing chlorine dioxide do not contain any chloride, chlorite, chlorate or perchlorate ions, they are also particularly suitable for the treatment of mains water or of water for the production of foodstuffs, for example baby nutrition.

A chlorine dioxide-containing aqueous solution which has a pH in the range from 6.8 to 7.2 and also has a ratio of the concentration of chlorine dioxide to the concentration of chlorate of greater than or equal to 2, particularly preferably greater than or equal to 5.71, preferably is totally salt-free, is preferably produced by a process according to the invention. The pH-neutrality of such solutions and the absence of salts is responsible for such chlorine dioxide-containing aqueous solutions produced by the process of the invention causing significantly less corrosion than the chlorine dioxide solutions which are produced by processes of the prior art. In particular, the corrosion of, for example, V2A steel, as is used in the food industry, and membranes is reduced.

As mentioned above, the present invention also provides an apparatus for producing an aqueous solution containing chlorine dioxide. In particular, the present invention provides an apparatus for carrying out the process of the invention, as is defined in the claims and has been explained in detail above; these explanations above also apply to the apparatus of the invention.

An apparatus of the invention for producing an aqueous solution containing chlorine dioxide and/or for carrying out the process of the invention (as defined above, preferably as referred to as preferred above) comprises:
  a first vessel for accommodating a first aqueous solution comprising dissolved chlorine dioxide and further dissolved constituents,
  a first conduit for a first gas stream, with the first conduit being equipped for introducing the first gas stream into a first aqueous solution which has been placed in the first vessel,
  a second vessel for accommodating an aqueous phase,
  a second conduit for a second gas stream, where the second conduit connects the first vessel and the second vessel and is equipped for contacting the second gas stream with the aqueous phase,
  a third conduit for a third gas stream, where the third conduit leads from the second vessel and is connected to the first conduit,
  one or more pump devices for producing the first, second and/or third gas stream,
  wherein
  the first vessel comprises a first aqueous solution comprising dissolved chlorine dioxide and further dissolved constituents
  and/or
  the second vessel comprises an aqueous solution containing chlorine dioxide.

Such an apparatus according to the invention is particularly suitable and provided for carrying out a preferred process according to the invention in which the first aqueous solution is produced in a first vessel in step (a) and the first gas stream is introduced into the first aqueous solution in the first vessel which has been produced according to step (a) for carrying out step (b).

It goes without saying that the step (a) of the process of the invention is in practice preferably carried out in the first vessel of the apparatus of the invention. Thus, the first aqueous solution comprising dissolved chloride dioxide and further dissolved constituents is preferably produced in the first vessel.

It goes without saying that the step (c) of the process of the invention is in practice preferably carried out in the second vessel of the apparatus of the invention. Gaseous chloride dioxide is thus preferably transferred in the second vessel from the second gas stream into an aqueous phase which has been placed in the second vessel, with chlorine dioxide being dissolved in the aqueous phase to form the aqueous solution containing chlorine dioxide and a third gas stream which is depleted in chlorine dioxide being formed.

It goes without saying that the second conduit of the apparatus of the invention is in practice preferably provided for conveying the second gas stream resulting from step (b) of the process of the invention from the first vessel to the second vessel, so that the second gas stream becomes able to come into contact with the aqueous phase in the second vessel.

It goes without saying that the third conduit of the apparatus of the invention is in practice preferably provided for conveying the third gas stream formed in step (c), which is depleted in chlorine dioxide, out of the second vessel (i.e. out of the vessel in which gaseous chlorine dioxide coming from the second gas stream is transferred into an aqueous phase) and feeding the third gas stream into the first conduit with which the third conduit is connected.

An apparatus according to the invention is preferably configured as required by the circumstances of the process of the invention which is to be carried out in the apparatus.

An apparatus according to the invention is therefore preferably closable so that chlorine dioxide cannot escape and particularly preferably closable so that neither chlorine dioxide nor carrier gas can escape (cf. the corresponding remarks made in respect of preferred processes according to the invention).

An apparatus according to the invention is preferably configured so that the first vessel comprises an outlet for aqueous solution, with the outlet preferably being closable by means of a valve. After completion of the process of the invention, the solution remaining in the first vessel (e.g. residual amounts of first aqueous solution) can be drained off through such an outlet. It goes without saying that the first vessel preferably also has an inlet for aqueous solution separate from the outlet.

An apparatus according to the invention is preferably configured so that the second vessel comprises an outlet for aqueous solution, with the outlet preferably being closable by means of a valve. After completion of the process of the invention, aqueous solution present in the second vessel (usually an aqueous solution as has been formed by means of step (c) of the process of the invention) can be taken from the second vessel.

An apparatus according to the invention is preferably configured so that the first vessel comprises one or more inlets for gaseous and/or liquid substances, with the inlet or the inlets preferably being closable by means of respective valves. A chlorine dioxide precursor or a first aqueous solution comprising dissolved chlorine dioxide and further dissolved constituents can, for example, be fed into the first vessel through an inlet for liquid substances and provided there in this way. A chlorine dioxide precursor or a gas containing chlorine dioxide or the first gas stream can, for example, be introduced through an inlet for gaseous substances into the first vessel.

In an apparatus according to the invention, the pump device or at least one of the plurality of pump devices is preferably selected from the group consisting of gas transport pumps and jet pumps, with the gas transport pump preferably being a compressed air diaphragm pump. Other types of pump can likewise be used, depending on the requirements of the process to be carried out and the properties of the respective individual apparatus according to the invention.

Preference is given to the pump device or at least one of the plurality of pump devices in an apparatus according to the invention being a jet pump which is designed so that during operation the aqueous phase from the second vessel acts as driving medium for the second gas stream and contacts the gases present therein. Such an embodiment of an apparatus according to the invention makes it possible to carry out a preferred process according to the invention in which the aqueous phase is moved in step (c), namely moved as driving medium in a jet pump. A corresponding embodiment is explained in more detail further below with the aid of an example. In an apparatus according to the invention, one or more further vessels for accommodating an aqueous phase are preferably provided and further conduits which connect the one or more further vessels with the first vessel and are equipped for contacting the second gas stream with an aqueous phase in the further vessel or vessels are provided, with valves preferably being provided in order to optionally convey the second gas stream into the second vessel and/or into the further vessel or vessels and/or with the one or more further vessels preferably each having an outlet for aqueous solution, where the outlet is preferably closable by means of a valve. Such an embodiment of an apparatus of the invention can be used advantageously especially when it is intended to free (deplete) the first aqueous solution present in the first vessel, which contains dissolved chlorine dioxide, particularly completely of dissolved chlorine dioxide. Fresh aqueous phase can be placed in each of the second and further vessels and the separation of chlorine dioxide from the aqueous solution in the first vessel can be gradually completed by switching from the second vessel to a further vessel, or successively to further vessels.

A semicontinuous process without significant interruptions in respect of the driving-off of chlorine dioxide from the first aqueous solution is also achieved by switching from the second vessel to a further vessel. This is very advantageous compared to process configurations and apparatuses which are operated without further vessels and therefore necessarily discontinuously.

To achieve the preferred very complete separation, the second gas stream is, in each case after appropriate switching or setting of the valves, successively contacted firstly with an aqueous phase in the second vessel and then with respective aqueous phases in the further vessel or vessels.

An apparatus according to the invention (preferably an apparatus according to the invention as described as preferred above) is preferably equipped for producing a gas circuit in which gas is circulated through at least the apparatus elements of first conduit, first vessel, second conduit, second vessel and third conduit. An apparatus which is equipped for producing such a gas circuit can preferably be used for loading the aqueous phase present in the second vessel with a maximum amount of chlorine dioxide.

In such a configuration, the pump device or at least one of the plurality of pump devices is preferably selected from the group consisting of gas transport pumps and jet pumps and the pump devices are then equipped for producing a gas circuit or for contributing to production of a gas circuit in which the gas is circulated through at least the apparatus elements of first conduit, first vessel, second conduit, second vessel and third conduit. Corresponding embodiments are described in more detail below with the aid of the examples.

An apparatus according to the invention (preferably an apparatus according to the invention as has been described as preferred above) in which a first temperature control device, preferably a first thermostat, is provided in order to control the temperature of the interior of the first vessel
and/or
a second temperature control device, preferably a second thermostat, is provided in order to control the temperature of the interior of the second vessel
is preferred.

The first and/or the second temperature control device is preferably equipped for setting a prescribed temperature difference between the interiors of the first vessel and the second vessel. The prescribed temperature difference is preferably greater than 10 K and is particularly preferably in the range from 10 K to 40 K. An apparatus according to the invention configured in this way is particularly suitable for carrying out a process according to the invention in which the first aqueous solution in step (b) has a temperature $T_1$ and the aqueous phase in step (c) has a temperature $T_2$, where $T_2$ is less than $T_1$ and the difference between $T_1$ and $T_2$ is greater than 10 K, preferably in the range from 10 K to 40 K. We refer to the corresponding information given in respect of preferred processes according to the invention.

If the apparatus according to the invention comprises one or more further vessels, what has been said above concerning the configuration and equipping of the second vessel applies analogously to each further vessel.

In a preferred apparatus according to the invention, an elimination module for chlorine gas is provided, with this being integrated into the second conduit and being equipped for reducing the ratio of the amounts of chlorine gas to chlorine dioxide gas and/or the amount of chlorine gas in the second gas stream, preferably by selective chemical reaction of chlorine. Chemical substances which are required for carrying out the reactions of chlorine gas explained in more detail above are preferably arranged in the elimination module. A preferred elimination module thus comprises solid chlorite salt or an aqueous chlorite solution. The arrangement of the elimination module is preferably selected so that gas flowing in the second conduit (comprising chlorine gas in addition to chlorine dioxide gas) can flow over or through said chemical substances in order to bring about the elimination.

A preferred apparatus according to the invention (preferably an apparatus according to the invention as described as preferred above) comprises one or more apparatus elements selected from the group consisting of auxiliaries for promoting the desorption of chlorine dioxide in the first vessel, preferably desorption-promoting internals such as bubble cap trays in the first vessel and/or a surface area-enlarging configuration of the interior wall of the first vessel by installation of, for example, lamellae, indentations or the use of a Vigreux-like structure and auxiliaries for promoting the absorption of chlorine dioxide in the second vessel or a further vessel, preferably a frit and/or Raschig rings for fine dispersion of gas from the second gas stream and/or absorption-promoting internals such as bubble cap trays and/or a surface area-enlarging configuration of the interior wall of the second vessel and/or further vessel by installation of, for example, lamellae, indentations or the use of a Vigreux-like structure.

In step (c) of the process of the invention, gaseous chlorine dioxide is transferred from the second gas stream into an aqueous phase. As indicated, step (c) is usually carried out in a second vessel of an apparatus according to the invention. Contacting of the aqueous phase (absorption solution) with the second gas stream (gas mixture of carrier gas/chlorine dioxide) preferably occurs in a vessel which contains one or more apparatus elements selected from the group consisting of immersion scrubbers (bubble column), spray scrubber, packed column or tray column scrubber, jet scrubber, swirl scrubber, rotational scrubber or Venturi scrubber, preferably one or more elements selected from the group consisting of immersion scrubber, packed column scrubber and tray column scrubber.

A preferred apparatus according to the invention comprises valves which are arranged on the first vessel in order to make pressure equalization possible. These valves preferably open automatically on obtaining a predefined subatmospheric pressure in the first vessel. The valves are preferably linked to an inert gas tank so that on attainment of a predefined subatmospheric pressure and automatic opening of the valves inert gas preferably flows into the first vessel to equalize the pressure. A subatmospheric pressure which results, for example, by withdrawal or depletion of chlorine dioxide in the first vessel can be countered by means of such valves or such a device of an apparatus according to the invention.

If a first aqueous solution containing dissolved chlorine dioxide is to be produced in the first vessel as per step (a) of the process of the invention by reaction of appropriate reactants, preference is given, as an alternative, to utilizing the subatmospheric pressure resulting from the depletion of carbon dioxide for conveying the liquid reactants necessary for the reaction from assigned stock vessels into the first vessel (the reactor) by means of one or more appropriate valves.

The process of the invention (as defined above and/or in the accompanying claims) is preferably carried out in an apparatus according to the invention (as defined above and/or in the accompanying claims).

The invention also provides for the use of an apparatus according to the invention (as defined above and/or in the accompanying claims) for carrying out a process according to the invention (as defined above and/or in the accompanying claims).

The invention will be illustrated below with the aid of examples with reference to the accompanying figures.

The figures show:

FIG. 1: schematic structure of an apparatus according to the invention as per example 1.

Figure 2:
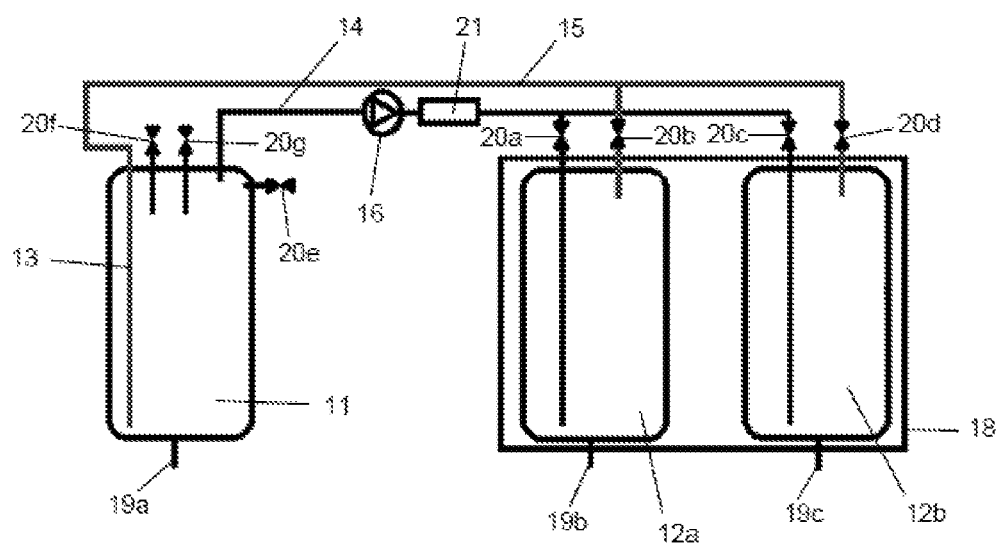

FIG. 2: schematic depiction of an apparatus according to the invention (chlorine dioxide production plant) for producing chlorine dioxide in a circulation process, with a gas pump and with an elimination module for chlorine gas.

Figure 3:
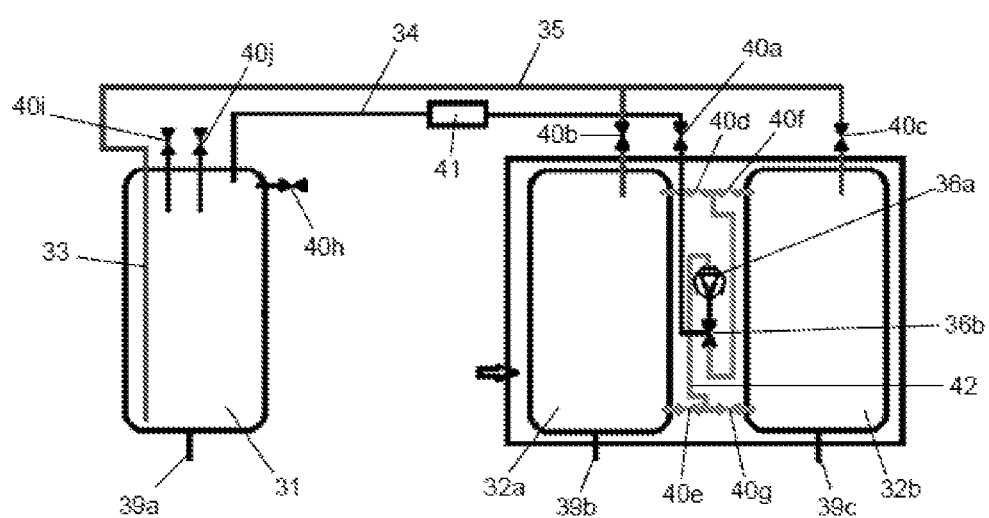

FIG. 3 schematic depiction of an apparatus according to the invention (chlorine dioxide production plant) for producing chlorine dioxide in a circulation process, with a water jet pump and with an elimination module for chlorine gas.

EXAMPLE 1

Apparatus for Use in the Laboratory and Studies Using Such an Apparatus

Studies were carried out using an inventive apparatus depicted schematically in FIG. 1. The apparatus of FIG. 1 is a laboratory set-up. The laboratory set-up (as example of an apparatus according to the invention) comprises a first wash bottle 1 (as example of a first vessel of an apparatus according to the invention) which acts together with a second wash bottle 2 (as example of a second vessel). A first conduit (with immersed tube) 3 opens into the first wash bottle 1 and is configured for introducing a first gas stream into a first aqueous solution which has been placed in the first vessel 1. A first aqueous solution comprising dissolved chlorine dioxide and further dissolved constituents is present in the wash bottle 1. Water (as an example of an aqueous phase), preferably distilled, deionized or mains water, is present in the second wash bottle 2. The first wash bottle 1 and the second wash bottle 2 are connected by a second conduit (with immersed tube) 4. The immersed tube 4 of the second conduit dips into the water present in the wash bottle 2. The second wash bottle 2 is connected via a third conduit 5 to a gas pump 6 (as example of a pump device) and then goes over into the first conduit 3. In FIG. 1, drawn-in arrows symbolize the flow direction of gas streams in the first, second and third conduit (3, 4, 5). In laboratory operation of the apparatus depicted in FIG. 1 (laboratory set-up). the gas pump makes carrier gas move from the wash bottle 1 via the second conduit 4 and the immersed tube thereof into the water in the wash bottle 2. There, the carrier gas is introduced at the bottom via the immersed tube. The carrier gas leaves the wash bottle 2 via the third conduit 5 and is then, transported by the gas pump 6, introduced via the first conduit 3 and the associated immersed tube thereof into the wash bottle 1; there, it enters at the bottom via the immersed tube. On mixing of the carrier gas with the first aqueous solution comprising dissolved chlorine dioxide and further dissolved constituents in the first wash bottle 1, the carrier gas becomes loaded with chlorine dioxide. Thus, the gas leaving the wash bottle 1 is not pure carrier gas but instead a chlorine dioxide/carrier gas mixture which enters the wash bottle 2 via the second conduit 4 and the immersed tube thereof. Here, the chlorine dioxide is partially absorbed by the water in the wash bottle 2. The lean (depleted) carrier gas then leaves the second wash bottle via the third conduit 5 and subsequently reenters the first wash bottle 1 via the gas pump 6 and the first conduit (with immersed tube) 3.

In a laboratory experiment, the stripping of the chlorine dioxide from the first aqueous solution comprising dissolved chlorine dioxide and further dissolved constituents in the first wash bottle 1 is repeated until the vapor pressure of the chlorine dioxide over the aqueous solution in wash bottle 1 reaches a steady state or is in equilibrium just as the vapor pressure of the chlorine dioxide over the aqueous solution formed in wash bottle 2. The degree of concentration of the chlorine dioxide in the second wash bottle 2 can be set by choice of temperatures in the aqueous liquids within the wash bottles 1 and 2. The speed at which the steady state is established is determined essentially by the size of the exchange area between the phases gas and aqueous solution in the wash bottles.

The process of the invention, i.e. a process for producing an aqueous solution containing chlorine dioxide from gaseous chloride dioxide and an aqueous phase, is thus carried out in the apparatus as shown in FIG. 1. The aqueous solution containing chlorine dioxide is formed in wash bottle 2, and the gaseous chlorine dioxide required for this flows together with carrier gas through the second conduit (with immersed tube) 4 into the second wash bottle 2 and is introduced into the aqueous phase (water) which is present there. Step (a) of the process of the invention, namely production of a first aqueous solution comprising dissolved chlorine dioxide and further dissolved constituents, preferably takes place in wash bottle 1. In the laboratory experiment, an aqueous chlorine dioxide solution which has been produced by a chlorine dioxide production process is provided there, as has been indicated in the general part of the description; in preferred embodiments, the production of the first aqueous solution occurs in wash bottle 1. Step (b) of the process of the invention, namely the transfer of dissolved chlorine dioxide from the first aqueous solution produced into a gas stream comprising a carrier gas so as to result in a second gas stream which comprises carrier gas and is enriched in gaseous chlorine dioxide, is in the laboratory experiment carried out by transferring the dissolved chlorine dioxide present in the first wash bottle 1 into a first gas stream which is introduced through the first conduit (with immersed tube) 3 into the wash bottle 1. This results in a second gas stream which leaves the wash bottle 1 via the second conduit 4. The second gas stream comprises the gaseous chlorine dioxide in addition to the carrier gas. The gaseous chlorine dioxide is (together with the carrier gas) introduced with the second gas stream into the aqueous phase (water) within the second wash bottle 2, with, according to step (c) of the process of the invention, gaseous chlorine dioxide being transferred into the aqueous phase and chlorine dioxide being dissolved in the aqueous phase in the second wash bottle 2 to form the aqueous solution containing chlorine dioxide. As per step (c) of the process of the invention, a third gas stream which is depleted in chlorine dioxide is formed. This third gas stream leaves the second wash bottle 2 via the third conduit 5. In the laboratory experiment, the third gas stream is introduced via the third conduit 5 and the pump device (gas pump) 6 into the first gas stream which is introduced via the first conduit 3 into the wash bottle 1. This forms a gas circuit in which, according to step (d) of the process of the invention, further amounts of the first gas stream are produced from the third gas stream (the third gas stream forms the first gas stream) and the inventive process steps (b) and (c) are thus repeated or continued, so that further amounts of chlorine dioxide are dissolved in the aqueous phase in the second wash bottle 2.

The carrier gas used in example 1 is inert toward chlorine dioxide. The first gas stream used in step (b) contains, after start-up of the process of the invention, i.e. after step (d) has been carried out for the first time, a proportion of chlorine dioxide since the first gas stream is then identical to the third gas stream which although it is depleted in chlorine dioxide is not (yet) completely free of chlorine dioxide. In step (c) of the process carried out in the laboratory set-up, the aqueous phase is arranged in a fixed position in the second wash bottle 2.

The laboratory set-up as per example 1 is closed in the above-described mode of operation, so that no gaseous chlorine dioxide escapes from the apparatus.

The first wash bottle and the second wash bottle each have a filled volume of 500 ml. In a laboratory experiment, the temperature in the first wash bottle 1 was set to 25° C. and the temperature in the second wash bottle 2 was set to 10° C. The initial concentration of chlorine dioxide in the first aqueous solution provided as per step (a) in the first wash bottle 1 was about 4000 mg/l, and the volume flow of the gas pump 6 was set to 80 l/h. The internal diameter of the openings of the immersed tubes (constituents of the first conduit 3 and second conduit 4) was in each case 0.5 cm.

After 150 minutes (measured from the commencement of pumping), the concentration of chlorine dioxide in the aqueous solution formed in the second wash bottle 2 had increased to a value of about 2500 mg/l. The aqueous solution in the first wash bottle 1 still contained a corresponding residual amount of chlorine dioxide.

After replacement of the immersed tubes (constituents of the first conduit 3 and second conduit 4) as per FIG. 1, in each case by glass frits P250 in accordance with ISO 4793, a concentration of about 3250 mg/l of chlorine dioxide was measured in the aqueous solution in the second wash bottle 2 after 150 minutes under otherwise identical process conditions.

After corresponding replacement of the immersed tube in the first wash bottle 1 by a glass frit P250, a concentration as high as 3500 mg/l was obtained in the aqueous solution within the second wash bottle 2 after 150 minutes when the immersed tube was kept in the second wash bottle 2 but a bed of 250 ml of Raschig rings having an area of 5 mm*5 mm was additionally used in wash bottle 2, under otherwise identical process conditions.

It can be seen from this that the process of the invention leads particularly quickly to highly concentrated aqueous chlorine dioxide solutions of high purity when appropriate auxiliaries for promoting the desorption of chlorine dioxide in the first vessel (first wash bottle 1) and appropriate auxiliaries for promoting the absorption of chlorine dioxide in the second vessel (second wash bottle 2) are employed.

A person skilled in the art will know that glass frits lead to a reduction in the bubble diameter compared to immersed tubes, while Raschig rings bring about particularly large bubble diameters.

EXAMPLE 2

Chlorine Dioxide Production Plant (200 Liters) for Producing a Chlorine Dioxide Solution which is Free of Chlorine, Chloride, Chlorate and Chlorite in a Circulation Process Using a Gas Pump and an Elimination Module for Chlorine Gas The main elements of the apparatus used in this example (200 liter plant) are depicted schematically in FIG. 2.

The apparatus of the invention as per FIG. 2 comprises a thermostatable reactor 11 (as example of a first vessel which is present according to the invention). In the reactor 11, reactants are reacted with one another so as to produce a first aqueous solution comprising dissolved chlorine dioxide and further dissolved constituents (in the sense of step (a) of the process of the invention). The apparatus of FIG. 2 additionally comprises two thermostatable absorption vessels 12a and 12b as examples of a second vessel (12a) and a further vessel (12b) of an apparatus according to the invention. Absorption vessel 12a and absorption vessel 12b are in each case provided for accommodating an aqueous phase and when the apparatus as per FIG. 2 is used chlorine dioxide is dissolved in the respective aqueous phase initially placed in the two absorption vessels 12a and 12b so as to form an aqueous solution containing chlorine dioxide. A first conduit 13 (with immersed tube) is present as shown in FIG. 2 and is equipped for introducing a first gas stream into a first aqueous solution (reaction mixture) which is present in the reactor 11 (first vessel). A second conduit 14 which connects the reactor 11 (first vessel) to the absorption vessel 12a (second vessel) and the absorption vessel 12b (further vessel) is provided. The second conduit 14 is configured for contacting a second gas stream which is discharged from the reactor 11 with the respective aqueous phase in the absorption vessel 12a or absorption vessel 12b. A gas pump 16 as example of a pump device provided according to the invention is integrated into the second conduit 14 so as to produce the second gas stream and thus also the further gas streams (in particular the first and third gas streams). Connecting pieces which connect the conduit 14 to the absorption vessels 12a and 12b are considered to be constituents of the conduit 14. A third (gas) conduit 15 leads from the absorption vessels in the direction of the reactor 11; it goes over into the first conduit 13. First and third conduits are in the present structure sections of a single component.

Closable outlets 19a, 19b and 19c are in each case assigned to the reactor 11 (first vessel) and also the absorption vessels 12a and 12b (second vessel and further vessel) and are configured for draining liquid (aqueous solutions) from the reactor 11 (outlet 19a), the absorption vessel 12a (outlet 19b) and the absorption vessel 12b (outlet 19c).

Valves 20a and 20b are assigned to the first absorption vessel 12a and the appropriately arranged sections of the second conduit 14 or the third conduit 15 so as to enable the corresponding conduits to be opened or closed. Corresponding valves 20c and 20d are assigned to the further absorption vessel 12b and the corresponding sections of the second conduit 14 or the third conduit 15. A valve 20e which is provided for supplying gas to the reactor 11 or for pressure equalization is assigned to the reactor 11 (first vessel).

The reactor 11 is additionally assigned addition valves 20f and 20g which allow the addition of precursors for the production of chlorine dioxide, e.g. the addition of sodium peroxodisulfate solution, potassium peroxomonosulfate solution, hydrochloric acid, sulfuric acid, phosphoric acid, chlorine bleaching liquor, solutions of hypochlorous acid, sodium chlorate solution, hydrogen peroxide solution or sodium chlorite solution.

An elimination module 21 for chlorine is likewise integrated into the second conduit 14 and adjacent to the gas pump 16. It is loaded with substances which on contact with chlorine bring about a reaction in which chlorine is converted into unproblematic reaction products. Such substances are, for example, solid sodium chlorite, aqueous sodium chlorite solutions, solid sodium arsenite or other reagents which react with gaseous chlorine, preferably react specifically only with chlorine.

The absorption vessels 12a and 12b are assigned a thermostat device 18 which can function as cooling device and is configured for setting the temperatures in the aqueous solutions within the absorption vessels 12a and 12b to a low temperature which is below the temperature in the reactor 11.

The reactor 11 and also the absorption vessels 12 and 12b each have a capacity of 200 liters. In the example, a volume flow of 129 l/h of 7.5% strength sodium chlorite solution via valve 20f and likewise 129 l/h of 9% strength hydrochloric acid solution via valve 20g are introduced over a period of 42 minutes by means of peristaltic pumps into the initially empty reactor 11 which has been thermostatted to 30° C. and mixed there.

A first aqueous solution comprising dissolved chlorine dioxide and further dissolved constituents is formed in the reactor 11, as per step (a) of the process of the invention. A chlorine dioxide gas/air mixture is formed over this first solution (chlorine dioxide solution) and this mixture is pumped by means of the gas pump 16 through the second conduit 14 from the reactor and pushed via the open valve 20a into the absorption vessel 12a which is initially charged with 160 liters of deionized water. The first conduit 14 provided for transport between the reactor 11 and the absorption vessel 12a opens into a gas lance which is fitted with a glass frit P250 within the absorption vessel 12a. The chlorine dioxide gas/air mixture which exits from the P250 glass frit into the water in the absorption vessel 12a bubbles through this water which has been cooled by the thermostat (cooling device) 18 to 6° C. Part of the chlorine dioxide gas (originating from the reactor 11 and conveyed by means of the gas pump 16 through the second conduit 14) introduced into the absorption vessel 12a dissolves in the water which has been placed in the absorption vessel 12a. Chlorine dioxide gas/air mixture which remains leaves the absorption vessel 12a again via the open valve 20b and is recirculated via the third conduit 15, which goes into the first conduit 13, back into the reactor 11. The first conduit 13 is for this purpose likewise equipped with a gas lance with P250 glass frit. The carrier gas subsequently becomes loaded again with chlorine dioxide which is continually being evolved by the hydrochloric acid-chlorite reaction during passage through the reactor 11. In the operations indicated above, the valves 20a and 20b which are assigned to the absorption vessel 12a are opened, while the valves 20c and 20d which are assigned to the absorption vessel 12b are closed.

The supply of precursor is interrupted by closure of the valves 20f and 20g (addition valves for addition of the precursors for chlorine dioxide production) in the example, so that the production of chlorine dioxide in the reactor 11 ceases.

As a result of closure of the valves 20a and 20b (which are assigned to the absorption vessel 12a) and opening of the valves 20c and 20d (which are assigned to the absorption vessel 12b, a further vessel of the apparatus of FIG. 2), a major part of the chlorine dioxide remaining in the reactor 11 (about 1 kg) is subsequently desorbed and this major part of chlorine dioxide is absorbed in the absorption vessel 12b which (like the absorption vessel 12a) is filled with water which, however, has not yet taken up any chlorine dioxide before opening of the valves 20c and 20d and therefore still has the maximum uptake capacity at this point in time.

The valves 20c and 20d are then closed, the gas gas pump 16 is switched off, the valve 20e is opened and the reactor 11 is emptied by opening the outlet 19a. The hydrochloric acid solution exiting in this case (because of the use of sodium chlorite solution and hydrochloric acid solution as reactants) is passed to neutralization; the neutralized product mixture is introduced into the waste water channel.

The chlorine dioxide solution produced in the absorption vessel 12a is taken off from this vessel by opening the outlet 19b and is fed to the respective user.

The process steps and measures explained above with reference to the absorption vessel 12a can also be carried out in an analogous way for or with the absorption vessel 12b. Chlorine dioxide solution is therefore taken off from the absorption vessel 12b after it has taken up the preset amount of chlorine dioxide in an absorption operation, as set forth above with reference to the absorption vessel 12a.

After the chlorine dioxide solution has been taken off from absorption vessel 12a or 12b, the at least partly emptied absorption vessels are refilled with fresh aqueous phase before a renewed absorption operation.

In the reactor 11, a virtually constant concentration of about 6 g/l of chlorine dioxide is established in about 10 minutes during the time of the reaction. In the absorption vessel 12a, a concentration of about 10.4 g/l has been established after a reaction time of only 10 minutes, which at a fill level of 160 l corresponds to a total mass of chlorine dioxide of about 1.7 kg. After 60 minutes, the concentration in the absorption vessel 12a is >20 g/l. It should be noted that sodium chlorite solution and hydrochloric acid solution were introduced into the reactor only for a time of 42 minutes; it goes without saying that the increase in the chlorine dioxide concentration in the absorption vessel 12a is therefore correspondingly limited.

In in-house experiments, chlorine dioxide concentrations in the range from 0 to 20 g/l were able to be established in the absorption vessel 12a during the course of the multistage absorption.

Solutions which are stable in the long term can be obtained by cooling the absorption solutions. In particular, the reaction $3\ H_2O + 6\ ClO_2 \rightarrow 5\ ClO_3^- + Cl^- + 6\ H^+$ is slowed by low temperatures. When the chlorine dioxide concentration in an absorption vessel is limited to a range of, for example, 2-3 g/l, the concentration remains in the recommended concentration range in accordance with EN 12671 and chlorine dioxide solutions which are stable for months are obtained. Chlorine dioxide concentrations in a desired range, e.g. in accordance with the recommendations of EN 12671, can, as an alternative or in a subsequent step, also be obtained by dilution of concentrated chlorine dioxide solutions produced with water, e.g. deionized water or mains water.

EXAMPLE 3

Chlorine Dioxide Production Plant (200 Liters) for Producing a Chlorine Dioxide Solution which is Free of Chlorine, Chloride, Chlorate and Chlorite in a Circulation Process Using a Water Jet Pump and an Elimination Module for Chlorine Gas The chlorine dioxide production plant used in example 3 comprises, as shown in FIG. 3, a thermostatted reactor 31 (a first vessel in the sense of the present invention), a thermostatable absorption vessel 32a containing water (a second vessel in the sense of the present invention), a thermostatable absorption vessel 32b containing water (a further vessel in the sense of the present invention), a first conduit 33 which is assigned to the reactor 31 (cf. the analogous description of FIG. 2, example 2), a second conduit 34 which connects the reactor 31 to the absorption vessels 32a and 32b (cf. the analogous structure as per FIG. 2, example 2) and also a third conduit 35 which connects the absorption vessel 32a and the absorption vessel 32b to the reactor 31, with the third conduit 35 going over into the first conduit 33 (cf. the analogous structure as per FIG. 2). The apparatus of FIG. 3 additionally comprises a pump 36a for pumping the liquid medium into the absorption vessels 32a and 32b; the pump 36a is arranged so that the medium being pumped can function as driving medium of an associated water jet pump 36b. The apparatus shown in FIG. 3 additionally comprises an elimination module 41 for chlorine. In addition, outlets 39a, 39b and 39c which, as shown in FIG. 3, are assigned to the reactor 31, the absorption vessel 32a and the absorption vessel 32b, respectively, are provided for draining liquid from these components. A valve 40a is arranged in the second conduit 34 and is configured to prevent the flow of gas through this conduit as required. A conduit system 42 comprises the pump 36a for pumping the liquid media. The absorption vessel 32a is connected via valves 40d and 40e and appropriate connection pieces to the conduit system 42, so that when the valves 40d, 40e are open liquid medium present in the absorption vessel 32a can be pumped through the conduit system 42 by means of the pump 36a; liquid medium is taken off at the bottom of the absorption vessel 32a (through the valve 40e) and fed back (through the valve 40d) to the top of the absorption vessel 32a. In an analogous way, the absorption vessel 32b is connected via valves 40f and 40g to the conduit system 42, so that the liquid medium can be pumped from the absorption vessel 32b. Downstream of the pump 36a, there is a water jet pump 36b which is configured for producing a gas flow in the second conduit 34 so that gas containing chlorine dioxide is transported from the reactor 31. Further valves 40h, 40i and 40j are assigned to the reactor 31. Valve 40h has a function like the valve 20e in FIG. 2; the function of the valve 40i corresponds to the function of the valve 20f in FIG. 2; and the valve 40j has a function like the valve 20g in FIG. 2. Reference is made to what has been said there.

The reactor 31 and also the absorption vessels 32a and 32b each have a capacity of 200 liters. In the example, a volume flow of sodium chlorite solution via valve 40i and hydrochloric acid solution via valve 40j are introduced by means of peristaltic pumps into the initially empty reactor 31 which has been thermostatted to 30° C. and mixed there.

In the reactor 31, a first aqueous solution comprising dissolved chlorine dioxide and further dissolved constituents is formed according to step (a) of the process of the invention. A chlorine dioxide gas/air mixture is formed over this first solution (chlorine dioxide solution). This is pumped from the reactor 31 through the second conduit 34 after opening of the valve 40a. It flows through the elimination module 41 for chlorine gas, which module is integrated into the second conduit 34. The chlorine dioxide gas/air mixture is, with valves 40d and 40e open and pump 36a for circulating the liquid medium present in the absorption vessel 32a by pumping switched on, transferred in the water jet pump 36b into the driving medium (water) circulating by pumping from the absorption vessel 32a and goes via the circuit of the liquid medium into the absorption vessel 32a.

The absorption vessel 32a was in in-house experiments initially charged with 160 liters of deionized water. The temperature in the first absorption vessel 32a and the liquid medium present therein (deionized water) was lower than the temperature in the reactor 31.

The pump 36a for pumping the liquid media draws the liquid medium from the absorption vessel 32a and sends it through the water jet pump 36b. The subatmospheric pressure generated in the water jet pump by the Venturi principle ensures intimate mixing of the chlorine dioxide gas/air mixture from reactor 31 with the liquid medium circulated by pumping from the absorption vessel 32a. Downstream of the valve 40d, the mixture of chlorine dioxide gas, air and liquid medium enters the absorption vessel 32a. There, separation of, in particular, the comparatively sparingly soluble carrier gas air from the mixture occurs; even small proportions of the gaseous chlorine dioxide are separated off and form a gas mixture with the air separated off. This gas mixture leaves the absorption vessel 32a as gas stream (third gas stream in the sense of the present invention) which is depleted in chlorine dioxide and is conveyed through the valve 40b and along the conduit 35 back to the reactor 31. During this operation, the valves 40c, 40g and 40f are closed. The carrier gas air once again becomes loaded with the chlorine dioxide which is continually evolved by the hydrochloric acid-chlorite reaction during subsequent passage through the reactor 31.

The supply of precursor is interrupted by closing the valves 40i and 40j (addition valves for addition of the precursors for chlorine dioxide production), so that the production of chlorine dioxide in the reactor 31 ceases.

As a result of closure of the valves 40b, 40d and 40e which are assigned to the first absorption vessel 32a and opening of the valves 40c, 40f and 40g which are assigned to the absorption vessel 32b (and a further vessel of the apparatus shown in FIG. 3), desorption of a major part of the chlorine dioxide remaining in the reactor 31 (about 1 kg) subsequently occurs and absorption of this major part of chlorine dioxide in the water present in the absorption vessel 32b subsequently occurs.

The absorption vessel 32b was, in in-house experiments, initially charged with 160 l of deionized water, which had not taken up any chlorine dioxide until the valves 40c, 40f and 40g had been opened and therefore had the maximum uptake capacity until the valves were opened.

The valves 40c, 40f and 40g are then closed, the pump 36a is switched off, the valve 40h is opened (in respect of its function corresponds to the valve 20e in FIG. 2) and the reactor 31 is then ended by opening the outlet 39a (cf. the analogous explanations concerning example 2, FIG. 2). The hydrochloric acid solution in this case is passed to neutralization; the neutralized product mixture is fed to the wastewater channel.

The chlorine dioxide solution produced in the absorption vessel 32a is taken off from this vessel by opening the outlet 39b and passed to the respective user.

After draining the contents of the reactor 31, closing the valve 40h, opening the valves 40a, 40c, 40g and 40f and also the valves 40i and 40j and starting up the pump 36a again, chlorine dioxide gas is transferred into the absorption vessel 32b, with what has been said above (with regard to the transfer of chlorine dioxide into the liquid medium in the absorption vessel 32a) applying analogously in respect of the action of the pump 36a and the water jet pump 36b.

Unless indicated otherwise, the configuration and use of the apparatus of example 3, FIG. 3, corresponds to the configuration and use of the apparatus of example 2, FIG. 2.

LIST OF REFERENCE NUMERALS

1 First wash bottle (first vessel)
2 Second wash bottle (second vessel)
3 First conduit (with immersed tube)
4 Second conduit (with immersed tube)
5 Third conduit
6 Gas pump (pump device)
7 Heating device (first temperature control device)
8 Cooling device (second temperature control device)
11; 31 Thermostatable reactor (first vessel)
12a; 32a Absorption vessel (second vessel)
12b; 32b Absorption vessel (further vessel)
13; 33 First conduit (with immersed tube)
14; 34 Second conduit (with immersed tube)
15; 35 Third conduit
16 Gas pump (pump device)
18 Cooling device, thermostat (second temperature control device)
19a Outlet for solution from 11
19b Outlet for solution from 12a
19c Outlet for solution from 12b
20a-g Valves
21; 41 Elimination module for chlorine
36a Pump for pumping the liquid media
36b Water jet pump
39a Outlet for solution from 31
39b Outlet for solution from 32a
39c Outlet for solution from 32b
40a-j Valves
42 Conduit system

The invention claimed is:

1. A process for producing an aqueous solution containing chlorine dioxide from gaseous chlorine dioxide and from an aqueous phase,
comprising the following steps:
(a) production of a first aqueous solution comprising dissolved chlorine dioxide and further dissolved constituents,
(b) transfer of dissolved chlorine dioxide from the first aqueous solution produced into a first gas stream comprising a carrier gas, resulting in a second gas stream which comprises carrier gas and is enriched in gaseous chlorine dioxide,
(c) transfer of gaseous chlorine dioxide from the second gas stream into an aqueous phase, with chlorine dioxide being dissolved in the aqueous phase to form the aqueous solution containing chlorine dioxide and a third gas stream which is depleted in chlorine dioxide being formed,
(d) production of further amounts of the first gas stream from the third gas stream
or
from a chlorine dioxide-containing fraction of the third gas stream and further added gaseous compounds
and repetition or continuation of the above process steps (b) and (c) so that further amounts of chlorine dioxide are dissolved in the aqueous phase,
where
the production of a first aqueous solution comprising dissolved chlorine dioxide and further dissolved constituents in step (a) is carried out by a process selected from the group consisting of:
acid-chlorite process,
hydrochloric acid-chlorite process,
acid-hypochlorite-chlorite process,
peroxodisulfate-chlorite process,
peroxodisulfate-peroxomonosulfate-chlorite process,
chloride electrolysis process,
chlorite electrolysis process
wherein the process is carried out in a closed apparatus so that no gaseous chlorine dioxide escapes from the apparatus
and where
the first aqueous solution in step (b) has a temperature $T_1$ and the aqueous phase in step (c) has a temperature $T_2$, where $T_2$ is less than $T_1$.

2. The process as claimed in claim 1, wherein
one, two or more of the further dissolved constituents of the first aqueous solution produced in step (a) are selected from the group consisting of acids and acid anhydrides, compounds containing peroxo groups and chlorine-containing compounds.

3. The process as claimed in claim 1, wherein the carrier gas used in step (b)
is inert toward chlorine dioxide
and/or
is selected for the group consisting of air, nitrogen, carbon dioxide, oxygen, noble gases and mixtures thereof.

4. The process as claimed in claim 1, wherein
the first gas stream used in step (b) contains a proportion of chlorine dioxide.

5. The process as claimed in claim 1, wherein
the first gas stream is introduced into the first aqueous solution produced in step (a) in order to carry out step (b),
and/or
the second gas stream resulting from step (b) is introduced into the aqueous phase in order to carry out step (c).

6. The process as claimed in claim 1, wherein
$T_2$ is in the range from 0° C. to 15° C.
and/or
$T_1$ is in the range from 20 to 40° C.
and/or
the difference between $T_1$ and $T_2$ is greater than 10 K.

7. The process as claimed in claim 1, wherein, in step (c), the aqueous phase
is fixed in place,
or
is moved.

8. The process as claimed in claim 7, wherein, in step (c), the aqueous phase is moved as driving medium in a jet pump in such a way that the second gas stream comes into contact with the moved aqueous phase and is taken up by the moved medium.

9. The process as claimed in claim 1, wherein, in step (b), chlorine gas is also transferred from the first aqueous solution produced into the first gas stream, so that the second gas stream is also enriched in chlorine gas.

10. The process as claimed in claim 9, wherein in step (b), the ratio of the amounts of chlorine gas to chlorine dioxide gas and/or the amount of chlorine gas in the second gas stream is reduced before step (c) by selective chemical reaction of chlorine.

11. The process as claimed in claim 1, wherein the process is continued at least until
the ratio of chlorine dioxide concentration in the first aqueous solution to chlorine dioxide concentration in the aqueous solution formed in step (c) has reached a predetermined value
and/or
the chlorine dioxide concentration or the amount of chlorine dioxide in the aqueous solution formed in step (c) has reached a predetermined value.

12. The process as claimed in claim 1, wherein the chlorine dioxide concentration in the chlorine-dioxide-containing aqueous solution formed in step (c)
is in the range from 5 to 20 g/l,
and/or
is set so that the corresponding concentration in the gas space at the prevailing temperature in accordance with DIN EN 12671:2016-09 is less than 300 $g/m^3$ and/or less than 10% by volume.

13. The process as claimed in claim 12, wherein the chlorine dioxide concentration in the chlorine-dioxide-containing aqueous solution formed in step (c) is in the range from 12 to 20 g/l.

14. The process as claimed in claim 12, wherein the chlorine dioxide concentration in the chlorine-dioxide-containing aqueous solution formed in step (c) is in the range from 15 to 20 g/l.

15. The process as claimed in claim 1, wherein the process is carried out in an apparatus comprising
a first vessel for accommodating a first aqueous solution comprising dissolved chlorine dioxide and further dissolved constituents,
a first conduit for a first gas stream, with the first conduit being equipped for introducing the first gas stream into a first aqueous solution which has been placed in the first vessel,
a second vessel for accommodating an aqueous phase,
a second conduit for a second gas stream, where the second conduit connects the first vessel and the second vessel and is equipped for contacting the second gas stream with the aqueous phase,
a third conduit for a third gas stream, where the third conduit leads from the second vessel and is connected to the first conduit,
one or more pump devices for producing the first, second and/or third gas stream,
wherein
the first vessel comprises a first aqueous solution comprising dissolved chlorine dioxide and further dissolved constituents
and/or
the second vessel comprises an aqueous solution containing chlorine dioxide.

16. An apparatus for producing an aqueous solution containing chlorine dioxide and/or for carrying out the process as claimed in claim 1, comprising
a first vessel for accommodating a first aqueous solution comprising dissolved chlorine dioxide and further dissolved constituents,
a first conduit for a first gas stream, with the first conduit being equipped for introducing the first gas stream into a first aqueous solution which has been placed in the first vessel,
a second vessel for accommodating an aqueous phase,
a second conduit for a second gas stream, where the second conduit connects the first vessel and the second vessel and is equipped for contacting the second gas stream with the aqueous phase,
a third conduit for a third gas stream, where the third conduit leads from the second vessel and is connected to the first conduit,
one or more pump devices for producing the first, second and/or third gas stream,
wherein
the apparatus is a closed apparatus, so that no gaseous chlorine dioxide escapes from the apparatus
the first vessel comprises a first aqueous solution comprising dissolved chlorine dioxide and further dissolved constituents
and/or
the second vessel comprises an aqueous solution containing chlorine dioxide.

17. The apparatus as claimed in claim 16, wherein
the first vessel comprises an outlet for aqueous solution,
and/or
the second vessel comprises an outlet for aqueous solution,
and/or
the first vessel comprises one or more inlets for gaseous and/or liquid substances,
and/or
the pump device or at least one of the plurality of pump devices is selected from the group consisting of gas transport pumps and jet pumps,
and/or
the pump device or at least one of the plurality of pump devices is a jet pump which is designed so that during operation the aqueous phase from the second vessel acts as driving medium for the second gas stream and contacts the gases present therein
and/or
one or more further vessels for accommodating an aqueous phase are provided and further conduits which connect the one or more further vessels to the first vessel and are configured for contacting the second gas stream with an aqueous phase in the further vessel or vessels are provided.

18. The apparatus as claimed in claim 16, wherein
the apparatus is configured for producing a gas circuit in which gas is circulated through at least the apparatus elements of first conduit, first vessel, second conduit, second vessel and third conduit,
where the pump device or at least one of the plurality of pump devices is configured for producing a gas circuit or for contributing to production of a gas circuit in which gas is circulated through at least the apparatus elements of first conduit, first vessel, second conduit, second vessel and third conduit.

19. The apparatus as claimed in claim 16, wherein
a first temperature control device is provided in order to control the temperature of the interior of the first vessel and/or
a second temperature control device is provided in order to control the temperature of the interior of the second vessel,
where the first temperature control device and/or the second temperature control device is configured for setting a prescribed temperature difference between the interior spaces of the first vessel and the second vessel, with the prescribed temperature difference being in the range from 10 K to 40 K.

20. The apparatus as claimed in claim 16, wherein an elimination module for chlorine gas is provided and is integrated into the second conduit and is configured for reducing the ratio of the amounts of chlorine gas to chlorine dioxide gas and/or the amount of chlorine gas in the second gas stream.

21. The apparatus as claimed in claim 16, further comprising one or more apparatus elements selected from the group consisting of
auxiliaries for promoting the desorption of chlorine dioxide in the first vessel,
and
auxiliaries for promoting the absorption of chlorine dioxide in the second vessel and/or a further vessel.

22. The apparatus as claimed in claim 21, wherein the auxiliaries for promoting the desorption of chlorine dioxide in the first vessel comprise desorption-promoting internals in the first vessel and/or a surface area-increasing configuration of the interior wall of the first vessel.

23. The apparatus as claimed in claim 21, wherein the auxiliaries for promoting the absorption of chlorine dioxide in the second vessel and/or a further vessel comprise a frit and/or Raschig rings for fine dispersion of gas from the second gas stream and/or absorption-promoting internals and/or a surface area-increasing configuration of the interior wall of the second vessel and/or further vessel.

24. The use of an apparatus as claimed in claim 16 for carrying out a process for producing an aqueous solution containing chlorine dioxide from gaseous chlorine dioxide and from an aqueous phase, comprising the following steps:
(a) production of a first aqueous solution comprising dissolved chlorine dioxide and further dissolved constituents,
(b) transfer of dissolved chlorine dioxide from the first aqueous solution produced into a first gas stream comprising a carrier gas, resulting in a second gas stream which comprises carrier gas and is enriched in gaseous chlorine dioxide,
(c) transfer of gaseous chlorine dioxide from the second gas stream into an aqueous phase, with chlorine dioxide being dissolved in the aqueous phase to form the aqueous solution containing chlorine dioxide and a third gas stream which is depleted in chlorine dioxide being formed,
(d) production of further amounts of the first gas stream from the third gas stream
or
from a chlorine dioxide-containing fraction of the third gas stream and further added gaseous compounds
and repetition or continuation of the above process steps (b) and (c) so that further amounts of chlorine dioxide are dissolved in the aqueous phase,
where
the production of a first aqueous solution comprising dissolved chlorine dioxide and further dissolved constituents in step (a) is carried out by a process selected from the group consisting of:
acid-chlorite process,
hydrochloric acid-chlorite process,
acid-hypochlorite-chlorite process,
peroxodisulfate-chlorite process,
peroxodisulfate-peroxomonosulfate-chlorite process,
chloride electrolysis process,
chlorite electrolysis process
and where
the first aqueous solution in step (b) has a temperature $T_1$ and the aqueous phase in step (c) has a temperature $T_2$, where $T_2$ is less than $T_1$.

* * * * *